United States Patent
Kikuzuki

(10) Patent No.: US 9,185,511 B2
(45) Date of Patent: Nov. 10, 2015

(54) WIRELESS COMMUNICATION METHOD, WIRELESS COMMUNICATION SYSTEM, AND WIRELESS COMMUNICATION APPARATUS

(71) Applicant: FUJITSU LIMITED, Kawasaki-shi, Kanagawa (JP)

(72) Inventor: Tatsuya Kikuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 13/719,827

(22) Filed: Dec. 19, 2012

(65) Prior Publication Data

US 2013/0195011 A1 Aug. 1, 2013

(30) Foreign Application Priority Data

Feb. 1, 2012 (JP) .................. 2012-020269

(51) Int. Cl.
  *H04W 4/00* (2009.01)
  *H04W 74/00* (2009.01)
  *H04L 1/18* (2006.01)

(52) U.S. Cl.
  CPC ............... *H04W 4/00* (2013.01); *H04L 1/1887* (2013.01); *H04W 74/006* (2013.01)

(58) Field of Classification Search
  CPC . H04W 28/04; H04W 28/044; H04W 28/046; H04W 72/00; H04W 74/0816; H04W 74/0825; H04W 74/0841; H04W 8/085; H04W 8/0858

USPC .................................................. 370/328–342
See application file for complete search history.

(56) References Cited

U.S. PATENT DOCUMENTS

| | | | | |
|---|---|---|---|---|
| 2002/0191594 | A1* | 12/2002 | Itoh et al. ....................... | 370/352 |
| 2006/0268772 | A1* | 11/2006 | Ko et al. ........................ | 370/329 |
| 2006/0292992 | A1* | 12/2006 | Tajima et al. ............... | 455/67.11 |
| 2011/0090850 | A1* | 4/2011 | So et al. ........................ | 370/328 |

FOREIGN PATENT DOCUMENTS

JP 2007-067654 * 3/2007

* cited by examiner

*Primary Examiner* — Kan Yuen
(74) *Attorney, Agent, or Firm* — Staas & Halsey LLP

(57) ABSTRACT

A wireless communication method includes: detecting, at a wireless communication apparatus, a collision of data transmitted from a plurality of wireless communication terminals during a first period that is in a communication-enabled state; shifting, when the collision has been detected, a second period, which belongs to the same frame as the first period and is in a communication-disabled state, to a communication-enabled state; transmitting, at the wireless communication apparatus, a request to the plurality of wireless communication terminals for retransmission of the data and receiving data transmitted from the plurality of wireless communication terminals in response to the request, using the shifted second period.

6 Claims, 10 Drawing Sheets

WIRELESS COMMUNICATION METHOD, WIRELESS COMMUNICATION SYSTEM, AND WIRELESS COMMUNICATION APPARATUS

CROSS-REFERENCE TO RELATED APPLICATION

This application is based upon and claims the benefit of priority of the prior Japanese Patent Application No. 2012-020269, filed on Feb. 1, 2012, the entire contents of which are incorporated herein by reference.

FIELD

The embodiments discussed herein are related to a wireless communication method, a wireless communication system, and a wireless communication apparatus.

BACKGROUND

To date, in a wireless communication system having a base station and a plurality of wireless communication terminals, each wireless communication terminal transmits a plurality of packets to the base station. Typically, each wireless communication terminal transmits packets at times determined by the wireless communication terminal. A plurality of packets from different transmission sources sometimes collide with each other in a period during which packet transmissions from wireless communication terminals contend with each other (hereinafter referred to as a "contention period"). A packet collision in the contention period blocks arrival of the packets at the base station. As a result, in this case, the base station requests each wireless communication terminal to retransmit a packet that has not arrived. In order to avoid such a collision, the base station sets, for a particular wireless communication terminal, a period during which packet transmissions will not contend with each other (hereinafter referred to as a "contention-free period"), and the particular wireless communication terminal transmits a packet addressed to the base station in the contention-free period.

Japanese Laid-open Patent Publication No. 2007-67654 is an example of the related art.

SUMMARY

According to an aspect of the invention, a wireless communication method includes: detecting, at a wireless communication apparatus, a collision of data transmitted from a plurality of wireless communication terminals during a first period that is in a communication-enabled state; shifting, when the collision has been detected, a second period, which belongs to the same frame as the first period and is in a communication-disabled state, to a communication-enabled state; and transmitting, at the wireless communication apparatus, a request to the plurality of wireless communication terminals for retransmission of the data and receiving data transmitted from the plurality of wireless communication terminals in response to the request, using the shifted second period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of a wireless communication method, a wireless communication system, and a wireless communication apparatus disclosed herein will be described in detail with reference to the accompanying drawings. The embodiments described below are not intended to limit the wireless communication method, wireless communication system, and wireless communication apparatus disclosed herein.

While inventing the present embodiments, observations were made regarding a related art. Such observations include the following, for example.

With a wireless communication system managed by using superframes of the related art, such as a wireless communication system described in Institute of Electrical and Electronics Engineers (IEEE) standard 802.15.6, a base station sometimes sets a period that is normally not used for communication (hereinafter referred to as a "redundant period") in order to be available for use by other wireless communication terminals. In such a system, a contention period and a redundant period coexist. Although, during a redundant period, the base station consistently remains in a state where communication is enabled. That is, the redundant period serves as the contention period, or as a period during which bandwidth is continuously allocated to a particular wireless communication terminal. For this reason, although in reality communication is seldom performed using the redundant period, the power consumption of the base station sometimes increases because of the redundant period.

The technology of the embodiments disclosed herein has been made in consideration of the foregoing. An object of the disclosed technology is to provide a wireless communication method, a wireless communication system, and a wireless communication apparatus that allow transmission delay to be reduced while suppressing power consumption.

First Embodiment

Figure 1:
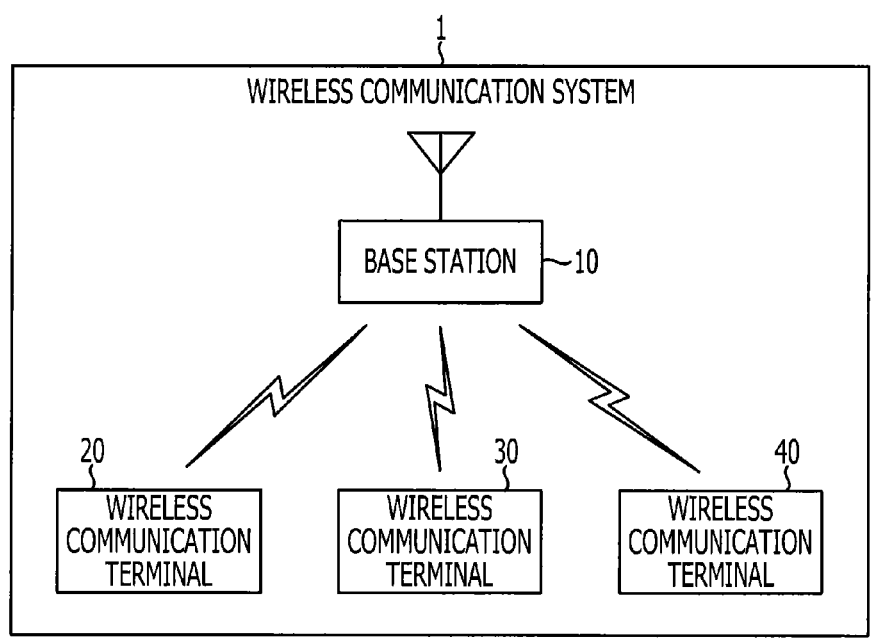
FIG. 1 illustrates a configuration of a wireless communication system.

The drawing illustrating a configuration of a wireless communication system 1 according to this embodiment is now referred to. As illustrated in FIG. 1, the wireless communication system 1 includes a wireless communication apparatus such as a base station 10, and includes three wireless communication terminals 20, 30, and 40. The base station 10 is coupled via a wireless channel to each of the wireless communication terminals 20, 30, and 40 so that the base station 10 can transmit and receive various types of signals and data to and from each wireless communication terminal in a packetized format. The wireless channel complies with a ZigBee (registered trademark) standard, for example, and may be comply with another communication standard, such as the Bluetooth (registered trademark) standard or a body area network (BAN) standard. Each of the wireless communication terminals 20, 30, and 40 individually transmits packets addressed to the base station 10 via an uplink wireless channel, and attempts to retransmit a packet if a collision occurs with packets whose source is a different terminal. In this embodiment, although packet retransmission is performed only after a request from the base station 10, the wireless communication terminals 20, 30, and 40 may each retransmit a packet spontaneously.

Figure 2:
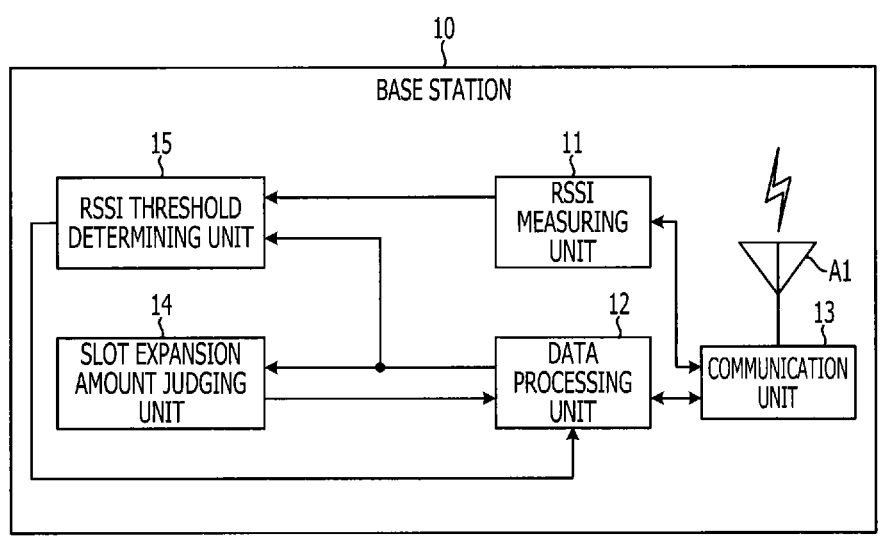
FIG. 2 illustrates a functional configuration of a base station.

FIG. 2 illustrates a functional configuration of the base station 10. As illustrated in FIG. 2, the base station 10 includes a communication unit 13, a data processing unit 12, a received signal strength indication (RSSI) measuring unit 11, a slot expansion amount judging unit 14, and a received signal strength indication (RSSI) threshold determining unit 15. The communication unit 13 has an antenna A1. Each of these components is coupled in one direction or two directions so as to allow input and output of signals and data.

The RSSI measuring unit 11 measures RSSI when a packet is received. That is, the RSSI measuring unit 11 measures RSSI using a packet input from the communication unit 13. The RSSI measuring unit 11 outputs the measured RSSI to the RSSI threshold determining unit 15, which is described later. Then, the RSSI measuring unit 11 detects a packet collision transmitted from the wireless communication terminals 20, 30, and 40 during a contention period while in a state (active state) where communication is enabled (hereinafter referred to as a "communication-enabled state").

The data processing unit 12 processes a packet received by the communication unit 13 in accordance with a given program, and outputs the result of processing in a packetized format to the communication unit 13. The data processing unit 12 refers to a result of feedback from the slot expansion amount judging unit 14, and then generates a packet for slot expansion. The data processing unit 12 controls an RSSI threshold by increasing or decreasing the RSSI threshold based on the result of feedback from the RSSI threshold determining unit 15. The data processing unit 12 also increases or decreases the redundant period in accordance with the number of times the communication unit 13 receives a packet.

The communication unit 13 transmits and receives packets, via a wireless channel, to and from the wireless communication terminals 20, 30, and 40. Using an increased redundant period, the communication unit 13 requests the wireless communication terminals 20, 30, and 40 to retransmit packets, and receives the packets transmitted, in response to the request, from the wireless communication terminals 20, 30, and 40.

The slot expansion amount judging unit 14 determines the amount of time slots (hereinafter referred to simply as "slots") to be expanded. That is, the slot expansion amount judging unit 14 determines the amount of slots to be expanded in the redundant period based on the actual usage of slots by each of the wireless communication terminals 20, 30, and 40, and feeds back the value of the amount of slots to be expanded to the data processing unit 12. The data processing unit 12 notifies the slot expansion amount judging unit 14 of the actual usage of slots by each of the wireless communication terminals 20, 30 and 40. The slot expansion amount judging unit 14 counts the number of times a packet has been received in the redundant period.

The RSSI threshold determining unit 15 decides a value of RSSI to be used as a reference when detecting a packet collision during a contention period, and sets the value as the RSSI threshold. That is, the RSSI threshold determining unit 15 decides the RSSI threshold based on the actual usage of slots by each of the wireless communication terminals 20, 30, and 40, and feeds back the value of the amount of the slots to be determined to the data processing unit 12. Here the actual usage of slots by each of the wireless terminals 20, 30 and 40 is notified to the RSSI threshold determining unit 15 by the data processing unit 12.

Figure 3:
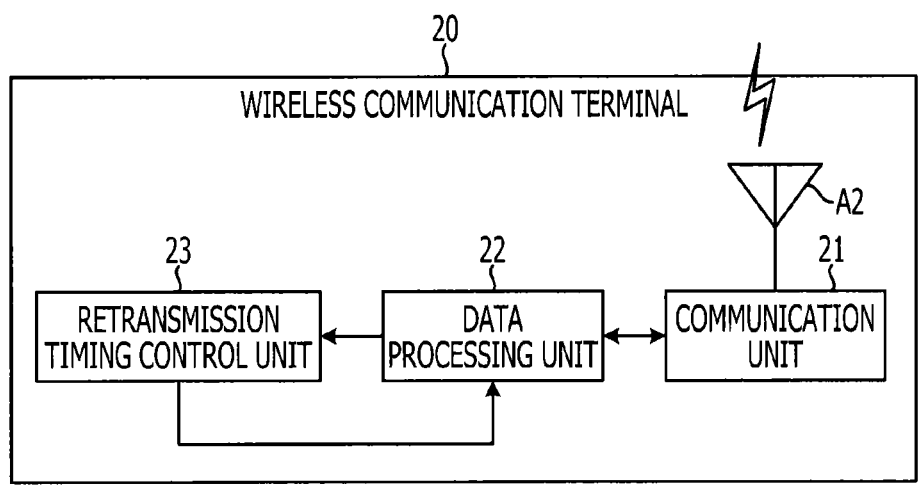
FIG. 3 illustrates a functional configuration of a wireless communication terminal.

FIG. 3 illustrates a functional configuration of the wireless communication terminal 20. As illustrated in FIG. 3, the wireless communication terminal 20 includes a communication unit 21, a data processing unit 22, and a retransmission timing control unit 23. The communication unit 21 has an antenna A2. Each of the components is coupled in one direction or two directions so as to allow input and output of signals and data.

The communication unit 21 transmits and receives packets, via a wireless channel, to and from the base stations 10. The communication unit 21 transmits a packet addressed to the base station 10 during a contention period. Also, if delivery of the packet to the base station 10 has not been acknowledged, the communication unit 21 retransmits the packet to the base station 10 during a redundant period in response to a request from the base station 10. The data processing unit 22 processes a packet received by the communication unit 21 in accordance with a given program, and outputs the result of processing in a packetized format to the communication unit 21. If delivery of a packet in the contention period has not been acknowledged, the retransmission timing control unit 23 determines a time at which the packet is to be retransmitted to the base station 10, and notifies the data processing unit 22 of the time.

Figure 4:
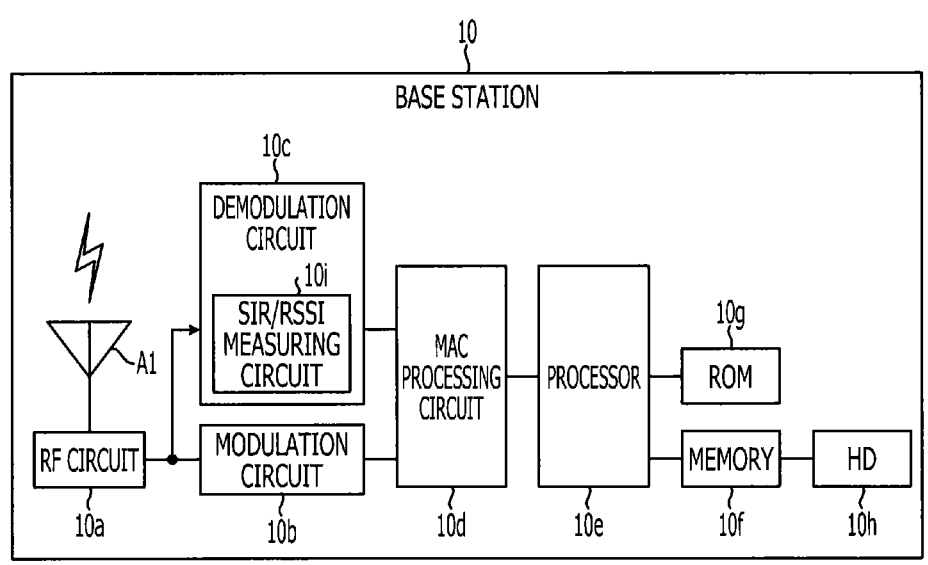
FIG. 4 illustrates a hardware configuration of the base station.

The hardware configuration of the base station 10 will be described next. FIG. 4 illustrates the hardware configuration of the base station 10 according to this embodiment. As illustrated in FIG. 4, in the base station 10, a radio frequency (RF) circuit 10a, a modulation circuit 10b, a demodulation circuit 10c, a media access control (MAC) processing circuit 10d, a processor 10e, a memory 10f, a read only memory (ROM) 10g, and a hard disk (HD) 10h are coupled so as to allow input and output of various types of signals and data. The RF circuit 10a has an antenna A1. The demodulation circuit 10c has a signal-to-interference ratio (SIR)/RSSI measuring circuit 10i integrated therein.

The processor 10e, which is, for example, a central processing unit (CPU) or a digital signal processor (DSP), exercises overall control over the base station 10. The memory 10f is, for example, a nonvolatile storage device, such as a flash memory, as well as a random access memory, such as a synchronous dynamic RAM (SDRAM). The memory 10f stores values of the amount of slots to be expanded and an RSSI threshold that are decided by the processor 10e, as well as packets retransmitted using the expanded slots, for example. For example, an algorithm that decides upon an RSSI threshold and an algorithm that controls slot expansion are stored in the ROM 10g. For example, the HD 10h stores in advance lower and upper thresholds for the number of packets received during a redundant period.

The communication unit 13 illustrated in FIG. 2 is implemented as hardware by the RF circuit 10a, the modulation circuit 10b, and the demodulation circuit 10c. The data processing unit 12 is implemented as hardware by the processor 10e. The RSSI measuring unit 11 is implemented as hardware by the SIR/RSSI measuring circuit 10i, which is part of the demodulation circuit 10c. The slot expansion amount judging unit 14 and the RSSI threshold determining unit 15 are each implemented as hardware by the processor 10e, the memory 10f, and the ROM 10g.

Figure 5:
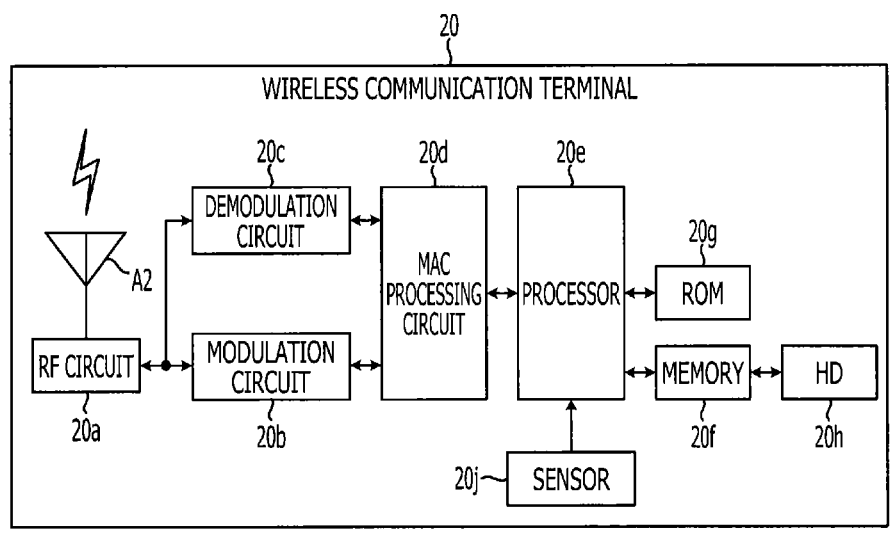
FIG. 5 illustrates a hardware configuration of the wireless communication terminal.

The hardware configuration of the wireless communication terminal 20 will be described next. FIG. 5 illustrates a hardware configuration of the wireless communication terminal 20. As illustrated in FIG. 5, in the wireless communication terminal 20, an RF circuit 20a, a modulation circuit 20b, a demodulation circuit 20c, a MAC processing circuit 20d, a processor 20e, a memory 20f, a ROM 20g, a HD 20h, and a sensor 20j are coupled so as to allow input and output of various types of signals and data. The RF circuit 20a has an antenna A2.

The communication unit 21 illustrated in FIG. 3 is implemented as hardware by the RF circuit 20a, the modulation circuit 20b, and the demodulation circuit 20c. The data processing unit 22 is implemented as hardware by the processor 20e. The retransmission timing control unit 23 is implemented as hardware by the processor 20e, the memory 20f, and the ROM 20g.

Although the configuration of the wireless communication terminal 20 has been described above, configurations of other wireless communication terminals 30 and 40 in the same system are similar to the configuration of the wireless communication terminal 20. Accordingly, reference characters whose last characters are the same are used for common components, and the illustration and detailed description of the common components are omitted.

Operations will be described next. It is assumed as a precondition for describing operations in this embodiment that the wireless communication scheme applied between the base station 10 and the wireless communication terminals 20, 30, and 40 is a ZigBee (registered trademark) wireless communication scheme. The wireless communication system 1 is managed by using superframes in, for example, a ZigBee (registered trademark) wireless communication scheme. A superframe has a frame length of several hundreds of milliseconds (for example, about 300 ms), and at least three kinds of periods—a contention period, a contention-free period, and a redundant period—are mixed in one superframe. Among these periods, the redundant period can be arbitrarily set by a system administrator (coordinator), unlike the contention period, which serves as a carrier sense multiple access (CSMA) period, and the contention-free period, which serves as a schedule period. The contention period, the contention-free period, and the redundant period each have a length of about 100 ms, for example.

Figure 6:
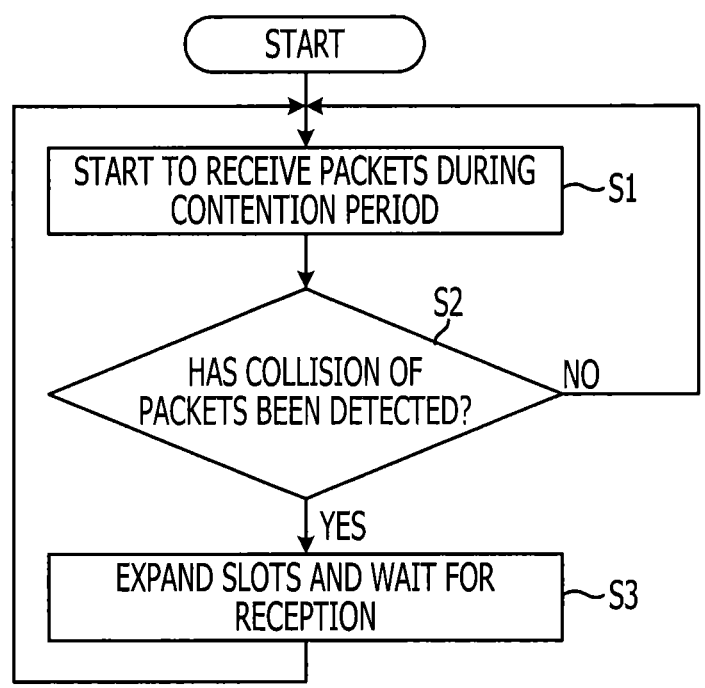
FIG. 6 is a flowchart for explaining operations of a base station according to a first embodiment.

FIG. 6 is a flowchart for explaining operations of the base station 10 according to the first embodiment. As illustrated in FIG. 6, in S1, the RF circuit 10a starts to receive packets during a contention period. The contention period is consistently in the active state where communication is enabled. For this reason, the base station 10 may be able to consistently receive packets transmitted from the wireless communication terminals 20, 30, and 40 during the contention period. However, slots are not individually allocated to terminals, and therefore a plurality of packets transmitted from different terminals sometimes collide with each other.

In S2, the processor 10e determines whether a packet collision has been detected. The presence of a collision is determined with reference to a threshold $T_3$ set in the memory 10f. That is, the processor 10e determines that a packet collision has occurred when the value of RSSI exceeds the threshold $T_3$ even if no packet has been received (S2; Yes). EDITOR: changed Then, the processor 10e expands slots during a redundant period, and thereby shifts the redundant period, which was in a sleep state, to the same active state as the state of the contention period. Thus, the existing redundant period shifts to a state where transmitting and receiving of packets is enabled. The processor 10e uses the redundant period to wait for reception of a new packet within the expanded slots (S3). After completion of the processing of S3, the process returns to S1, and thereafter the above processing is performed repeatedly.

More specifically, at the time of expansion of slots that is associated with detection of a packet collision, the RF circuit 10a broadcasts a poll packet (retransmission request packet) in order to urge the wireless communication terminals 20, 30, and 40 to retransmit packets. The wireless communication terminals 20, 30, and 40 receive the poll packet, and then retransmit, using the redundant period, packets whose delivery has not been acknowledged. The base station 10 waits to receive the packets retransmitted at this time.

Conversely, if no collision of packets has been detected by completion of the contention period (S2; No), then the process returns to S1, and the processor 10e waits to receive packets in the next contention period.

A method of deciding the initial value of the RSSI threshold $T_3$ is now described. The value of the threshold $T_3$ is controlled by increasing or decreasing the value in accordance with the number of packets received in the redundant period after expansion of slots, and the initial value is set to −80 dBm, for example. That is, when the noise in the antenna A1 and propagation environment of the base station 10 is −90 dBm, and the value of the RSSI when a packet is received is between −80 to −50 dBm, the minimum RSSI is defined as −80 dBm. Accordingly, the base station 10 may set the initial value of the RSSI threshold $T_3$ to −80 dBm in typical operational patterns. When the base station 10 wants to give priority to control of transmission delay of packets over reduction in power consumption, a value (for example, −85 dBm) between the noise level and the minimum RSSI may be set as the initial threshold $T_3$. In contrast, when the base station 10 wants to reduce power consumption even if a reduction in power consumption would result in transmission delay, a value (for example, −75 dBm) slightly larger than the minimum RSSI may be set as the initial threshold $T_3$.

Although the RSSI exceeding the threshold $T_3$ and a packet not being received is given as an example of the technique employed by the processor 10e to detect a packet collision, the technique is not limited thereto. For example, there is provided another technique in which the occurrence of a collision is detected where although the RF circuit 10a normally receives the head of a packet (for example, header check sequence (HCS), preamble), the RF circuit fails to receive the rest of the packet (for example, payload, interframe gap (IFG)).

Moreover, as mentioned above, expansion of slots is not limited to the use of a redundant period as a contention period (that is, substantial expansion of the contention period). For example, expansion of slots includes individually allocating bandwidth to a particular wireless communication terminal using a contention-free period. That is, expansion of slots allows the base station 10 to use a redundant period either as a contention period or as a contention-free period. Furthermore, as a technique for selecting a particular wireless communication terminal, a wireless communication terminal to which bandwidth is to be allocated may be selected by using a source ID when the base station 10 has successfully received the header portion of a packet. Alternatively, the base station 10 may select a wireless communication terminal to which a contention-free period has not yet been allocated within a given period such as a superframe, as a wireless communication terminal to which a bandwidth is to be allocated.

Figure 7:
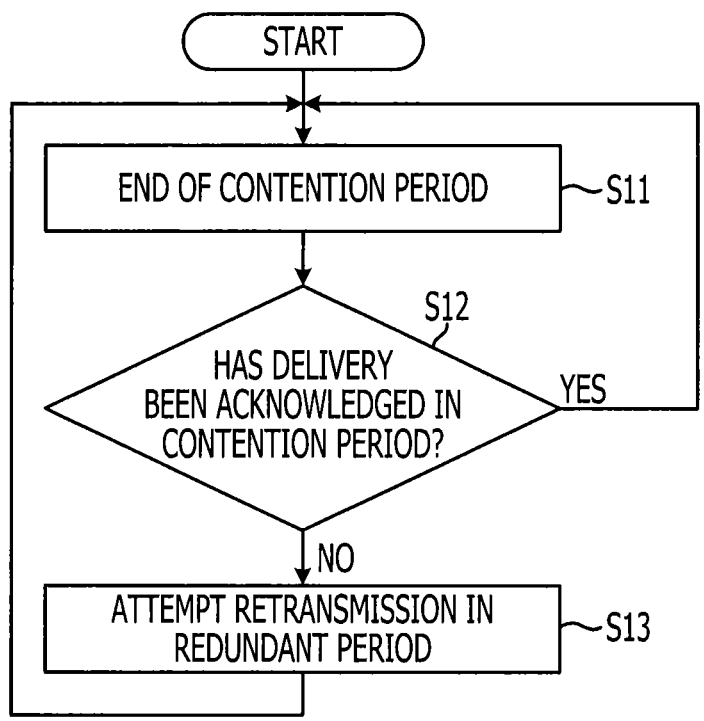
FIG. 7 is a flowchart for explaining operations of a wireless communication terminal according to the first embodiment.

Operations of the wireless communication terminals 20, 30, and 40 in the present embodiment will be described next. FIG. 7 is a flowchart for explaining operations of the wireless communication terminal 20 according to the first embodiment.

In S11, the processor 20e of the wireless communication terminal 20 waits for completion of a contention period. Next, the processor 20e determines whether delivery of a packet addressed to the base station 10 and transmitted in the contention period has been acknowledged (S12). The processor 20e normally completes delivery acknowledgement upon receipt of a packet representing acknowledgment (ACK) from the base station 10 for every packet to be transmitted. If delivery has been acknowledged (S12; Yes), then the process returns to S11 and the processor 20e waits for completion of the next contention period.

If delivery has not been acknowledged during the remaining time of the contention period (S12; No), then the processor 20e determines that a collision has occurred for a packet whose delivery has not been acknowledged (that is, an undelivered packet), and attempts to retransmit the packet in the redundant period (S13). In S13, the processor 20e attempts to retransmit an undelivered packet in cases such as when extension of the contention period in the redundant period is declared by the base station 10 and when an individual poll packet for the wireless communication terminal 20 is received. After completion of the processing of S13, the process returns to S11 and repeatedly performs the above processing again.

More specifically, the RF circuit 20a retransmits an undelivered packet in the redundant period in response to receiving a poll packet broadcast as a retransmission request packet. At this point, there is a possibility that a packet collision may occur again if the plurality of wireless communication terminals 20, 30, and 40 that have received the broadcast poll packet retransmit packets in unison. In order to avoid such a possibility, when the contention period is expanded, the wireless communication terminals 20, 30, and 40 each avoid reoccurrence of a packet collision using the following expression (1). That is, a packet can be retransmitted during a redundant period by each of the wireless communication terminals 20, 30, and 40 only after retransmission is permitted by a probability Pr calculated by the random probability expression (1).

$$Pr = \max(1/8, (1/2)/\text{ceil}((R+1)/2)) \quad (1)$$

Here, in the above expression (1), max (A, B) defines adopting a larger value between A and B. Here ceil(C) represents the smallest integer greater than or equal to C. R represents the number of times retransmission is performed, and its initial value is 1.

When each of the wireless communication terminals 20, 30, and 40 retransmits a packet, the above expression is applied. Thus, if one of the wireless communication terminals 20, 30, and 40 repeats unsuccessful transmission, the number of times R retransmission is performed increases, and therefore the packet retransmission probability Pr in the redundant period changes as follows.

$$Pr = 1/2(R=1), 1/4(R=2), 1/4(R=3), 1/6(R=4), 1/6(R=5), 1/8(R=6), 1/8(R=7), 1/8(R=8), 1/8(R=9), 1/8(R=10) \ldots$$

Accordingly, times at which the wireless communication terminals 20, 30, and 40 retransmit packets are distributed, and thus reoccurrence of a packet collision caused by retransmission during a redundant period may be avoided.

For example, like with IEEE 802.15.6, a wireless communication system in which the base station 10 does not notify the wireless communication terminal 20 when the redundant period is also assumed. In such a system, the wireless communication terminal 20 will attempt retransmission, not during a redundant period, but either in a superframe period to which a contention period in which the wireless communication terminal 20 has attempted to transmit a packet belongs, or in a given period in a state where communication is enabled.

The operations of the wireless communication terminal 20 have been described in overview above. The same processing as for the wireless communication terminal 20 may be performed on the wireless communication terminals 30 and 40.

Figure 8:
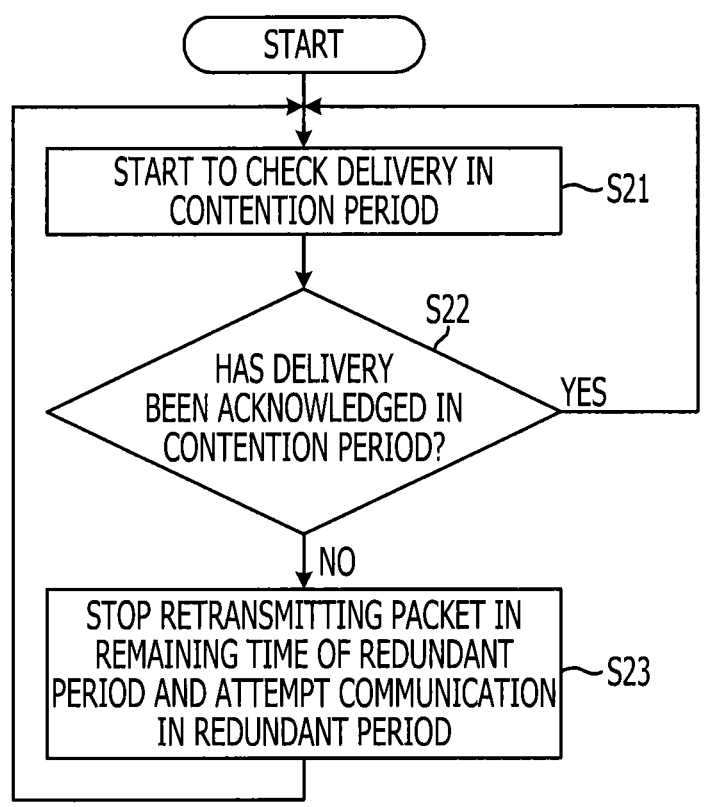
FIG. 8 is a flowchart for explaining operations of a wireless communication terminal according to a first modification.

Subsequently, a first modification that is a modified form of the first embodiment will be described. FIG. 8 is a flowchart for explaining operations of the wireless communication terminal 20 according to the first modification.

As illustrated in FIG. 8, in S21, the RF circuit 20a starts a process for checking delivery of a packet during a contention period. Next, the processor 20e determines whether delivery of a packet, which is addressed to the base station 10 and transmitted during a contention period, has been acknowledged (S22). The processor 20e normally completes delivery recognition upon receipt of a packet indicating ACK from the base station 10 for every packet that is transmitted. If delivery has been acknowledged (S22; Yes), then the process returns to S21, and the processor 20e waits to start rechecking in the current contention period or start checking delivery in the next contention period.

Conversely, if delivery has not been acknowledged during the remaining time of the contention period (S22; No), then the processor 20e determines that a collision has occurred for a packet whose delivery has not been acknowledged, and stops retransmitting the packet in the remaining time of the redundant period. Then, the processor 20e attempts to retransmit the packet in the redundant period (S23). After completion of the processing of S23, the process returns to S21 and repeatedly performs the above processing again.

As described above, in the foregoing first embodiment, the wireless communication terminal 20 transmits packets for the first time during a contention period, and thereafter attempts to retransmit a packet whose delivery has not been acknowledged in the same contention period. However, the main cause of the occurrence of a packet collision in the contention period is due to the hidden terminal problem. In a situation affected by the hidden terminal problem, even if the wireless communication terminal 20 retransmits a packet, a collision is highly likely to occur again after carrier sensing is performed again. To address this, in the first modification, unlike the first embodiment, if the wireless communication terminal 20 detects a packet collision during a contention period, it waits for a redundant period without attempting retransmission in the same contention period. In other words, the wireless communication terminal 20 expects a redundant period to be used and stops communication during a contention period in order to perform retransmission in the redundant period.

As described above, with retransmission during a redundant period, retransmission timing is controlled using the above expression (1), or bandwidth is individually allocated to the wireless communication terminal 20. As a result, with retransmission in the redundant period, the probability that a recollision will occur is lower than retransmission in the contention period. This means that, in the former case of controlling a retransmission timing using the above expression (1), the probability that each terminal performs transmission is only Pr even if the terminal is a hidden terminal, and therefore the probability that a recollision will occur is lower than that in a CSMA period in which a collision inevitably occurs after carrier sensing. In the latter case of individual bandwidth allocation, the possibility that a collision will occur is likely to be low. That is, during a redundant period, collisions may be more reliably avoided than during a contention period, and therefore retransmission of a packet in the redundant period is more likely to be completed within a superframe than in the contention period. Accordingly, the wireless communication terminal 20 does not perform retransmission using a contention period, and waits for a redundant period and attempts to retransmit a packet in the redundant period. As a result, the wireless communication terminal 20 may complete retransmission of a packet while suppressing terminal loads and communication loads associated with packet retransmission during a contention period.

As described above, in the wireless communication system 1, the plurality of wireless communication terminals 20, 30, and 40 transmit packets to the base station 10. The wireless communication system 1 includes the base station 10 and the plurality of wireless communication terminals 20, 30, and 40. The base station 10 has the RSSI measuring unit 11, the data processing unit 12, and the communication unit 13. The RSSI measuring unit 11 detects a packet collision transmitted from the plurality of wireless communication terminals 20, 30, and 40 in a first period (that is, the contention period) in a communication-enabled state (that is, the active state). If the collision has been detected, the data processing unit 12 increases (that is, expands slots for) a second period (that is, the redundant period) that belongs to the same superframe as the first period and that is in a communication-disabled state (that is, a sleep state) to shift the second period to a communication-enabled state. Using the shifted second period, the communication unit 13 broadcasts a poll packet in order to provide a request to the plurality of wireless communication terminals 20, 30, and 40 for retransmission of the packets, and receives packets transmitted from the plurality of wireless communication terminals 20, 30, and 40 in response to the request. The plurality of wireless communication terminals 20, 30, and 40 include the communication units 21, 31, and 41, respectively. Each of the communication units 21, 31, and 41 transmits a packet to the base station in the first period and, if delivery of the packet to the base station 10 has not been acknowledged, retransmits the packet to the base station 10 in the second period in response to a request. At this point, the communication unit 13 of the base station 10 may receive data transmitted from a wireless communication terminal (for example, the wireless communication terminal 30) randomly selected from among the wireless communication terminals 20, 30, and 40, in response to the request.

As described above, the base station 10 selects a scheme that utilizes a redundant period in packet communication as appropriate to encourage each of the wireless communication terminals 20, 30, and 40 to perform retransmission. Thus, when the base station 10 has failed to receive a packet within a contention period because of a packet collision, the base station 10 can receive the packet via retransmission during a redundant period. At this point, the redundant period, during which the base station 10 is normally in a sleep state, is used as extension of the contention period, during which the base station 10 is consistently in an active state (that is, a communication-enabled state), only when a packet collision has been detected. That is, usage of a redundant period is limited to the cases described above, and therefore power consumption is less than existing cases where the redundant period is consistently in the communication-enabled state (such as when the base station consistently uses a redundant period as a contention period, or when the base station consistently allocates a redundant period to a particular terminal). In other words, an increase in unnecessary power consumption may be avoided. In addition, in response to a request from the base station, a packet that has collided with another packet is retransmitted during a redundant period belonging to the same superframe as for the above contention period. Typically, superframes are arranged at given time intervals (for example, three minutes to one hour). Accordingly, each wireless communication terminal retransmits a packet within the same superframe, without waiting for the next superframe, and thus the delay in transmission of packets is reduced. Accordingly, the base station 10 may reduce packet delay while suppressing power consumption.

A request for retransmission of a packet and actual retransmission of a packet are implemented by expanding a contention period, or allocating wireless bandwidth (allocation of a contention-free period) to a particular terminal. In the latter bandwidth allocation, the base station 10 may select a terminal to which bandwidth is not allocated for a given period (for example, 100 to 300 ms) as a wireless communication terminal to which a bandwidth is to be allocated. Alternatively, in the latter bandwidth allocation, the base station 10 may refer to a terminal ID received when detecting a packet collision and specify, based on the ID, a wireless communication terminal to which a bandwidth is to be allocated. The expression "referring to the received terminal ID" as used here means that in situations such as when, although a terminal ID contained in a header portion or the like has been successfully received, packets collide with each other in a payload portion subsequent to the header portion and as a result the base station 10 fails to receive the packet, the base station 10 refers to the successfully received terminal ID. In such a case, the wireless communication terminal having the ID concerned is selected as a terminal to which wireless bandwidth (contention-free period) for retransmission of a packet is allocated. Communication during a redundant period that is specified by a poll packet may be such that not only the ID of a terminal to which communication is to be established but also a period during which communication is to be maintained may be set. In this case, the base station 10 may freely allocate bandwidth so that part of a redundant period is utilized for expansion of a contention period, and another part is utilized for allocation to a particular terminal.

Second Embodiment

A second embodiment will be described next. The configuration of the wireless communication system 1 according to the second embodiment is similar to the configuration of the wireless communication system 1 according to the first embodiment illustrated in FIG. 1. The configurations of a base station and a wireless communication terminal according to the second embodiment are similar to the configurations of the base station and the wireless communication terminal according to the first embodiment illustrated in FIG. 2 to FIG. 5. Accordingly, in the second embodiment, the same reference characters are used for components common to those in the first embodiment, and illustration and detailed description thereof are omitted. The aspect in which the second embodiment differs from the first embodiment is operations of the base station 10. That is, although, in the first embodiment, the base station 10 waits to receive packets without controlling to increase or decrease the slots once the slots have been expanded, in the second embodiment, the base station 10 controls the expansion frequency (the number of times expansion is performed per given time) and the expansion of slots that have been expanded by increasing or decreasing the expanded slots in accordance with the number of received packets. Hereinafter, operations of the base station 10 according to the second embodiment so will be described with reference to FIG. 9 focusing on differences from the first embodiment.

Figure 9:
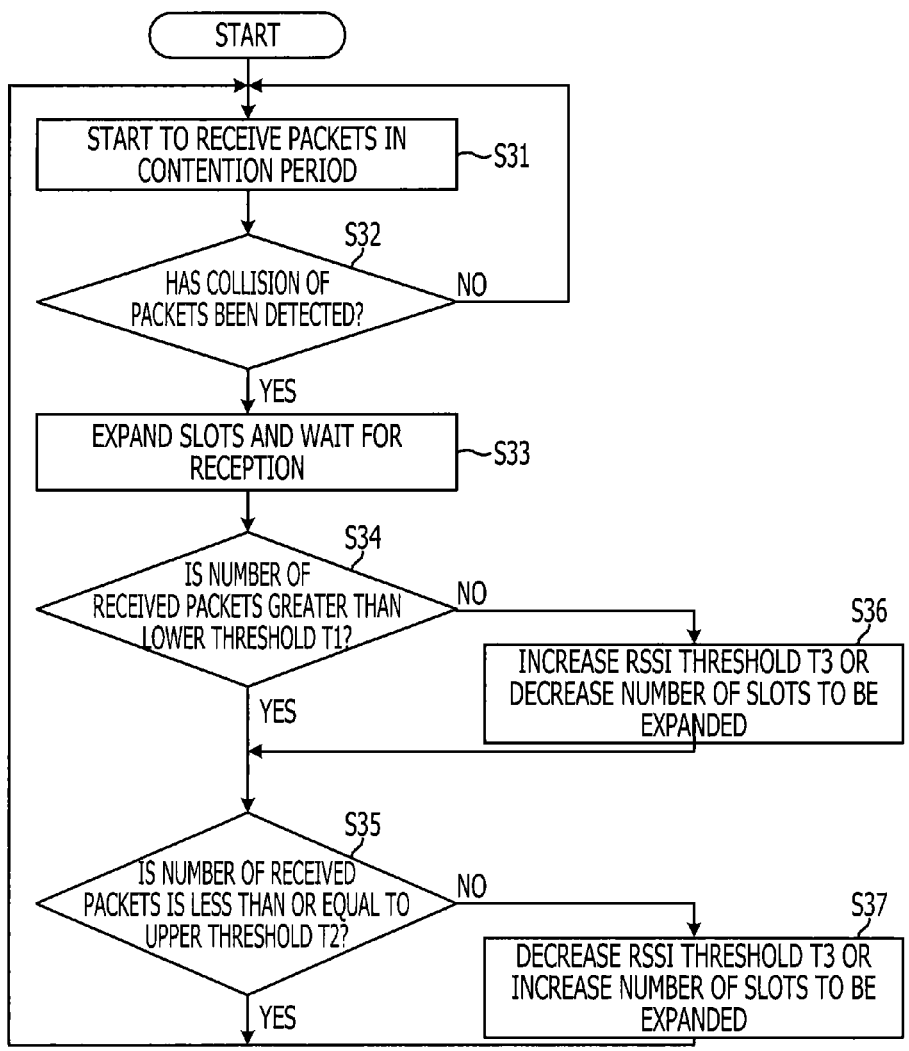
FIG. 9 is a flowchart for explaining operations of a base station according to a second embodiment.

FIG. 9 is a flowchart for explaining operations of the base station 10 according to the second embodiment. FIG. 9 illustrates steps that are in common with FIG. 6 that has been referred to for the description of operations according to the first embodiment. The common steps are denoted by reference characters whose last characters are the same, and detailed description thereof is omitted. Specifically, steps S31 to S33 of FIG. 9 correspond to steps S1 to S3 illustrated in FIG. 6, respectively.

In S34, the processor 10e determines whether the number of packets received within the slots expanded in S33, that is, the number of packets received in the redundant period exceeds a lower threshold $T_1$. If the result of the determination is that the number of received packets is greater than the lower threshold $T_1$ (S34; Yes), then the processor 10e determines whether the number of received packets within the slots expanded in S33, that is, the number of received packets in the redundant period is less than or equal to an upper threshold $T_2$ (S35). If the result of determination is that the above number of received packets is less than or equal to the upper threshold $T_2$ (S35; Yes), then the number of received packets is maintained at a value that is appropriate for the current redundant period. For this reason, the process returns to S31, and the processor 10e instructs the RF circuit 10a to resume receiving packets during a contention period.

Here, in packet communication during a redundant period, when the proportion of actually used slots of given slots is excessively small, slots are in excess in the redundant period. This leads to wasteful consumption of power of the base station 10, which is not preferable from the viewpoint of saving power. In contrast, when the proportion of actually used slots of the given slots is excessively large, there may be insufficient slots in the redundant period. This may result in generation of packets that are unable to be transmitted from the wireless communication terminals 20, 30, and 40 (that is, packet loss). Accordingly, the wireless communication system 1 preferably transmits and receives packets using about 70 to 80% of the given slots, for example. Therefore, as a lower threshold $T_1$ of the number of received packets, the base station 10 may, for example, set a number of packets that is equivalent to 40% of the total number of packets that are able to be transmitted and received using slots. Likewise, as the upper threshold $T_2$ of the number of received packets, the base station 10 may, for example, set the number of packets equivalent to 90% of the total number of packets that can be transmitted and received using slots.

If the result of the determination in S34 mentioned above is that the above number of received packets is less than or equal to the lower threshold $T_1$ (S34; No), then it can be determined that the proportion of used slots for the given number of slots is excessively small. That is, it may be determined that although a packet collision has been detected, the number of packets used for retransmission in the redundant period is sufficiently small at this point. Accordingly, the processor 10e decreases the slots expanded in S33 and shortens the redundant period. As a technique for this, the processor 10e may either raise the RSSI threshold $T_3$ or decrease the number of expanded slots (S36). If the processor 10e raises the threshold $T_3$ for RSSI, detecting a packet collision becomes more difficult than before and expanding slots becomes more difficult. That is, the frequency of slot expansion decreases. In contrast, if the processor 10e decreases the number of expanded slots that are to be allocated, the amount of expansion of slots decreases. That is, the width of slot expansion decreases. With either of the above techniques, the number of slots that were expanded in S33 decreases, and therefore the redundant period is shortened.

The processor 10e need not select just one of the two techniques mentioned above and may employ both the two techniques. After completion of processing for S36, since adjustment of slots has been completed, the process shifts to the foregoing processing for S35.

If the result of determination in S35 mentioned above is that the above number of received packets is greater than the upper threshold $T_2$ (S35; No), then it can be determined that the proportion of actually used slots out of allocated slots is excessively large. That is, it may be determined that, when a packet collision is detected, the number of packets that have not been delivered and have been left in the wireless communication terminals 20, 30, and 40 is sufficiently large. Accordingly, the processor 10e further increases the number of slots expanded in S33 and expands the redundant period. As a technique for this, the processor 10e may either decrease the RSSI threshold $T_3$ or increase the number of expanded slots (S37). If the processor 10e decreases the RSSI threshold $T_3$, detecting a packet collision becomes easier than before and it becomes easier to expand slots. That is, the frequency of expansion of slots increases. In contrast, if the processor 10e increases expanded slots to be allocated, the amount of expansion of slots increases. That is, the width of slot expansion increases. With either of the above techniques, the slots once expanded in S33 further increases, and therefore the redundant period increases.

In S37 just as in S36, the processor 10e need not select just one of the two techniques mentioned above and may employ both the two techniques. After completion of processing of S37, since adjustment of slots has been completed, the process shifts to the above-mentioned processing of S31. Then, the processor 10e waits for reception of packets in the next contention period to start again.

Here, regarding an increase and a decrease in the RSSI threshold $T_3$ in S36 and S37 mentioned above, the processor 10e can increase or decrease the RSSI threshold $T_3$ in units of 5 dB, for example, so that a new threshold $T_3$ is equal to the current threshold $T_3$ plus or minus 5 dB. Likewise, regarding control of slots by decreasing and increasing the slots in S36 and S37 mentioned above, the processor 10e can decrease or increase the slots in units of 3 packets, for example, so that a new amount of slots to be allocated is equal to the current amount of slots to be given plus or minus the amount of expansion of slots for 3 packets.

As described above, with the wireless communication system 1 according to the second embodiment, the base station 10 includes at least the data processing unit 12 and the slot expansion amount judging unit 14. The slot expansion amount judging unit 14 counts the number of times a packet has been received in the second period (redundant period). The data processing unit 12 increases or decreases the frequency of expansion or the amount of expansion in the second period, which has been shifted from the communication-disabled period to the communication-enabled period, in accordance with the number of times a packet has been received. Specifically, the data processing unit 12 decreases the shifted second period when the number of times a packet has been received is below a first given value (the lower threshold $T_1$). The data processing unit 12 increases the shifted second period when the number of times a packet has been received is above a second given value (the upper threshold $T_2$), which is greater than the first given value. As a result, the frequency at which slots are expanded and the amount of slot expansion may be controlled by the base station 10, and the proportion of use of the redundant period is adjusted so as to be consistently maintained at a given value (for example, about 80%). Accordingly, control of expansion of slots without excess and deficiency may be achieved. As a result, adaptive and efficient practical use of a redundant period is enabled.

Figure 10:
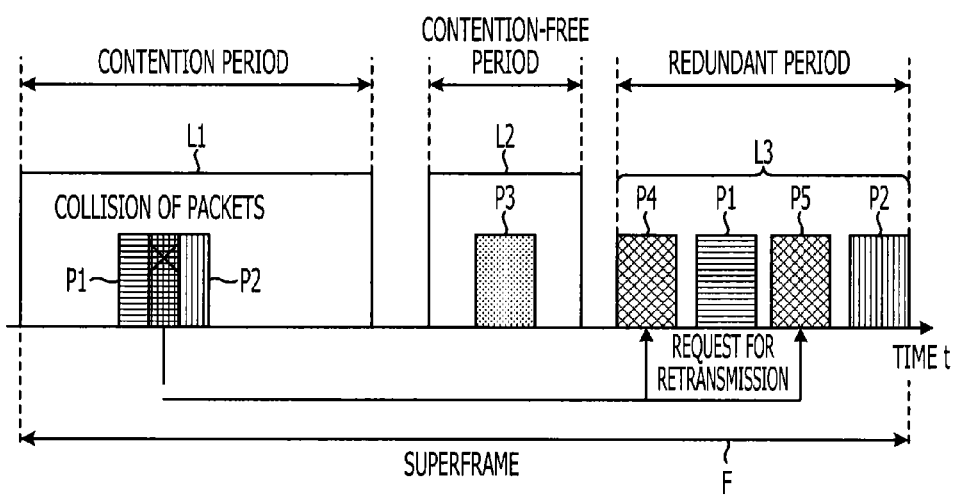
FIG. 10 illustrates a manner in which periods are used for transmission of packets from terminals within one superframe.

Next, a method with which the wireless communication system 1 transmits and receives packets using a contention period, a contention-free period, and a redundant period will be described with reference to FIG. 10. FIG. 10 illustrates a manner in which the periods are used for transmission of packets from the wireless communication terminals 20, 30, and 40 within one superframe F. As illustrated in FIG. 10, it is assumed that, in the superframe F, a packet P1 and a packet P2 transmitted from the wireless communication terminals 20 and 30 collide with each other during a contention period L1 located at the beginning of the axis of time t.

Within a contention-free period L2, a slot for a packet P3 transmitted from the wireless communication terminal 40 is allocated on the time axis using a time division multiplex (TDM) scheme. This slot is individually allocated by the base station 10, using the contention-free period L2, to the packet P3 for the exclusive use of the packet P3 in order for the wireless communication terminal 40 to transmit the packet P3 to the base station 10. Accordingly, the packet P3 does not collide with other packets in the contention-free period L2. In contrast, in the contention period L1, bandwidth is not individually allocated to packets, unlike in the contention-free period L2. Accordingly, a plurality of packets may collide with each other in the same manner as the packets P1 and P2.

When a collision is detected by the base station 10, retransmission is requested by transmission of poll packets P4 and P5. In FIG. 10, the poll packet P4 is a packet for allocating a bandwidth to the wireless communication terminal 20, and therefore the wireless communication terminal 20 attempts to retransmit the packet P1, which was transmitted previously in the contention period L1, within the redundant period L3 in response to receipt of the poll packet P4. In the redundant period L3, since the packet P1 is retransmitted using bandwidth individually allocated by the poll packet P4, a re-collision in the redundant period L3 is avoided. Likewise, the poll packet P5 is a packet for allocating bandwidth to the wireless communication terminal 30. Accordingly, the packet P2 retransmitted in response to reception of the poll packet P5 does not re-collide with other packets in the redundant period L3.

As described above, when a packet collision occurs in the contention period L1, with a conventional technique, a wireless communication terminal waits to retransmit a packet until a contention-free period or a contention period that is allocated to the terminal in the next superframe. The wireless communication terminals 20, 30, and 40 according to this embodiment, however, may retransmit packets using the redundant period L3 in the current superframe. Accordingly, packet delay may be suppressed sharply depending on the transmitting interval of a superframe. In addition, the redundant period L3 is not consistently used as a retransmitting period, and is used as a retransmitting period only when a packet collision occurs. Accordingly, the power consumption of the base station 10 may be suppressed.

As a field to which the wireless communication system 1 according to the present embodiment is to be applied, networks where excessive traffic does not occur are desirable since coexistence of a contention period and a redundant period is a precondition for the wireless communication system 1. In addition, the wireless communication system 1 is a system that reduces delay in packet transmission, and therefore networks where packet delay could cause a serious trouble are desirable. Furthermore, it is desirable that networks to which the wireless communication system 1 is to be applied are networks where the amount of allocation of a contention-free period to each terminal is small, that is, networks in which traffic to be exchanged in the contention-free period is low and power-saving is sought for are desirable. This is because, with networks where many contention-free periods can be allocated, communication in the contention-free period is the most effective way to reduce collisions. From these perspectives, it is preferable that the wireless communication system according to this embodiment is applied to BANs, for example. In BANs, information sensed by a sensor (corresponding to the wireless communication terminals 20, 30, and 40) attached to a human body is often transmitted and received at a low frequency, such as about once an hour, and thus the amount of traffic is small. In BANs, conversely, an urgent packet, with which delay could cause a serious problem, is sometimes used in order to notify that danger to life or a physical body is imminent. With reasoning similar to the case with BANs, it may be preferable that the wireless communication system 1 according to this embodiment is, for example, applied to a monitoring network in a factory that uses measurement of temperature in the external world at given time intervals (for example, once an hour).

While ZigBee (registered trademark) has been illustrated as an example of a wireless communication scheme applied between the base station 10 and the wireless communication terminals 20, 30, and 40 in the foregoing embodiments, the wireless communication scheme is not limited to this, and may be Bluetooth (registered trademark), WiFi (registered trademark), or the like. Each of the foregoing embodiments is applicable not only to short-distance wireless communication but also to wireless communication that uses long term evolution (LTE) or 3rd Generation (3G).

In each of the foregoing embodiments, components of the base station 10 and the wireless communication terminals 20, 30, and 40 may preferably not be configured physically just as illustrated in the drawings. That is, specific manners of distribution or integration of devices are not limited to those illustrated in the drawings, and the entirety or part of the devices may be configured so as to be functionally or physically distributed or integrated in arbitrary units in accordance with various loads, use conditions, and the like. For example, the slot expansion amount judging unit 14 and the RSSI threshold deciding part 15 may be integrated into one component, or the data processing units 22, 32, and 42 and the retransmission timing control units 23, 33, and 43, respectively, may be integrated into one unit. Conversely, for example, the slot expansion amount judging unit 14 may be divided into a portion that counts the number of packets received within a redundant period, and a portion that actually determines the frequency and the amount of expansion of slots. Further, a memory in which RSSI and its threshold or received packets are stored may be provided as an external device of the base station 10 and be coupled thereto via a network or a cable.

In the foregoing description, individual configurations and operations have been described in each embodiment. However, the wireless communication system 1 according to each embodiment may also include elements characteristic to other embodiments or modifications. The combination of embodiments and modifications is not limited to a combination of two of them, and arbitrary forms, such as a combination of three or more of embodiments and modifications, may be employed. For example, the base station 10 according to the second embodiment may perform slot expansion control processing in accordance with the number of received packets, and stop retransmission for the remainder of a contention period and wait for a redundant period as in the first modification. Moreover, one wireless communication system may include all the elements described in the first and second embodiments and the first modification.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method comprising:
    detecting, at a wireless communication apparatus, a collision of data transmitted from a plurality of wireless communication terminals during a first period that is in a communication-enabled state;
    shifting, when the collision has been detected, a second period, which belongs to the same frame as the first period and is in a communication-disabled state, to a communication-enabled state;
    transmitting, at the wireless communication apparatus and using the shifted second period, a request to the plurality of wireless communication terminals for retransmission of the data and receiving data transmitted from the plurality of wireless communication terminals in response to the request; and
    counting the number of times data has been received in the second period,
    wherein the shifting decreases the shifted second period when the number of times data has been received is below a first given value, and increases the shifted second period when the number of times data has been received is above a second given value that is greater than the first given value.

2. The wireless communication method according to claim 1, wherein
    the receiving, in response to the request, receives data transmitted from a wireless communication terminal randomly selected from among the wireless communication terminals.

3. A wireless communication system comprising:
    a wireless communication apparatus; and
    a plurality of wireless communication terminals configured to transmit data to the wireless communication apparatus,
    the wireless communication apparatus configured
        to detect a collision of data transmitted from the plurality of wireless communication terminals during a first period that is in a communication-enabled state,
        to, when the collision has been detected, shift a second period that belongs to the same frame as the first period and that is in a communication-disabled state, to a communication-enabled state,
        to transmit, using the shifted second period, a request to the plurality of wireless communication terminals for retransmission of the data and receive data transmitted from the plurality of wireless communication terminals in response to the request, and
        to count the number of times data has been received in the second period, and decrease the shifted second period when the number of times data has been received is below a first given value, and increase the shifted second period when the number of times data has been received is above a second given value that is greater than the first given value, and
    the plurality of wireless communication terminals each configured
        to transmit the data to the wireless communication apparatus in the first period and to retransmit the data to the wireless communication apparatus in the second period in response to the request when delivery of the data to the wireless communication apparatus has not been acknowledged.

4. The wireless communication system according to claim 3, wherein
    the wireless communication apparatus, in response to the request, receives data transmitted from a wireless communication terminal randomly selected from among the wireless communication terminals.

5. A wireless communication apparatus comprising:
    a memory; and
    a processor configured to execute a procedure in the memory, the procedure including
        a detection process configured to detect a collision of data transmitted from a plurality of wireless communication terminals during a first period that is in a communication-enabled state,
        a control process configured to, when the collision has been detected, shift a second period that belongs to the same frame as the first period and that is in a communication-disabled state, to a communication-enabled state,
        a communication process configured to transmit, using the shifted second period, a request to the plurality of wireless communication terminals for retransmission of the data and receive data transmitted from the plurality of wireless communication terminals in response to the request, and
        a counting process configured to count the number of times data has been received in the second period,
        wherein the control process is configured to decrease the shifted second period when the number of times data has been received is below a first given value, and to increase the shifted second period when the number of times data has been received is above a second given value that is greater than the first given value.

6. The wireless communication apparatus according to claim 5, wherein
    the communication process is configured to, in response to the request, receive data transmitted from a wireless communication terminal randomly selected from among the wireless communication terminals.

* * * * *